Patented Apr. 14, 1953

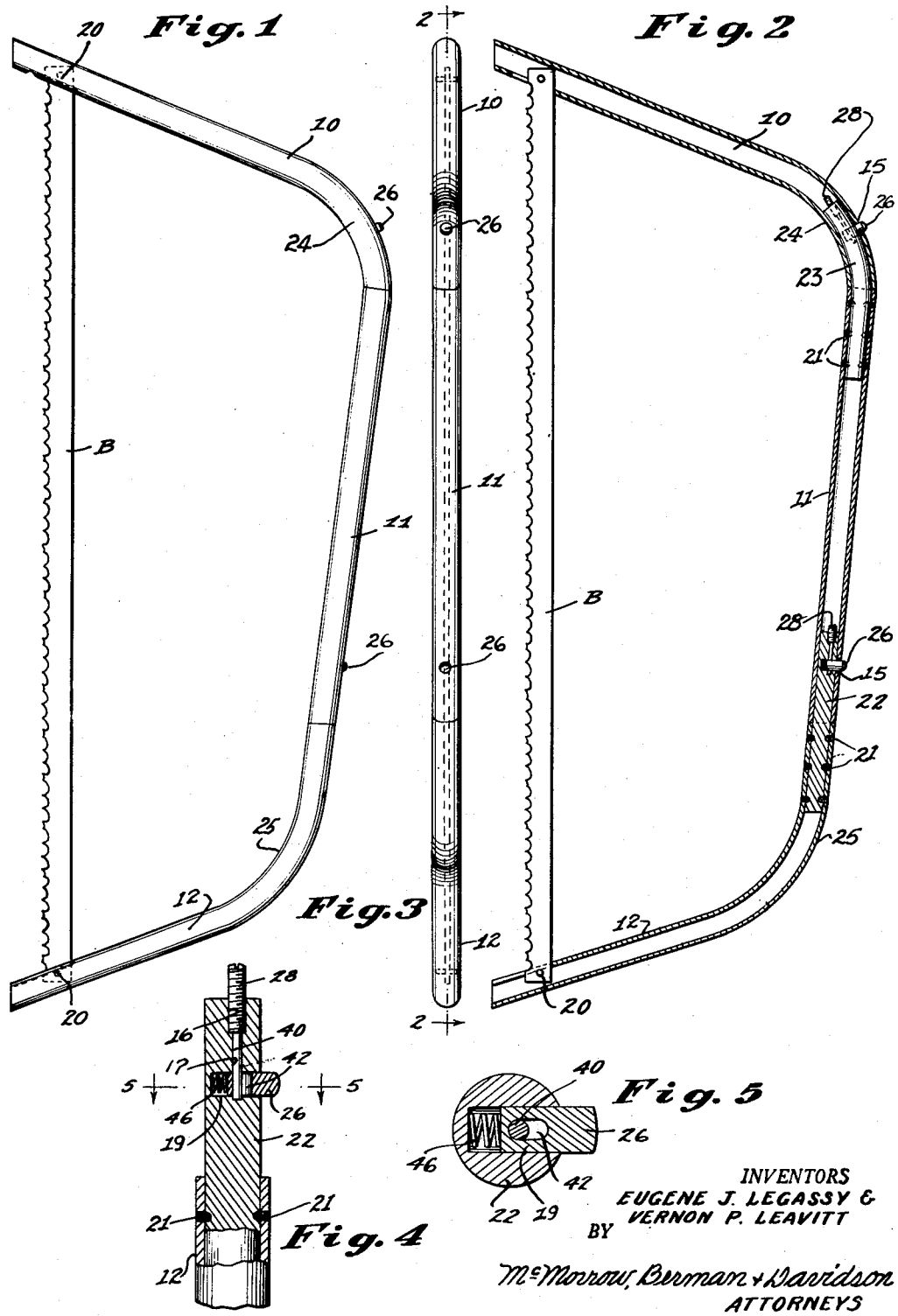

2,634,994

UNITED STATES PATENT OFFICE 2,634,994

SAW-BLADE SUPPORTING HANDLE

Eugene J. Legassey and Vernon P. Leavitt, Limestone, Maine

Application October 21, 1947, Serial No. 781,126

1 Claim. (Cl. 287—127)

This invention relates to saw-blade supporting handles, and is directed more particularly to the provision of novel means whereby a saw blade of any given length may be suitably supported at its opposite ends in such a way that maximum efficiency may be attained.

It is a principal object of the invention to provide a unique supporting handle for a saw blade which is calculated to facilitate the adjustment thereof relative to the blade member.

As will eventually appear, the supporting handle member is composed of two or more sections which are nested or fitted together in order to form a unit and then the opposite ends of the composite unit are connected to the opposite end portions of the blade.

Still a further object of the invention is the provision of a unitary, but composite, support of the type referred to which is simple in form so as to be economical to manufacture and which at the same time is facile of manipulation. It will be later brought out how easily the parts of the assembly may be connected.

Various other objects and advantages of the invention will become more apparent after a reading of the following description and reference will be had to the accompanying drawings, wherein:

Figure 1 is a side elevational view of the supporting handle of the invention having a saw blade associated therewith;

Figure 2 is a longitudinal vertical sectional view taken substantially on the plane of the line 2—2 of Figure 3;

Figure 3 is a plan view of the device;

Figure 4 is an enlarged view, partly in section, of a portion of the frame unit;

Figure 5 is a sectional view on the line 5—5 of Figure 4.

Referring now to the drawings more in detail, the invention will be fully described.

There is a plurality of tubular frame-forming sections 10, 11 and 12 which are preferably made of metal, but could conceivably be of other material. While, in the drawings, there are shown two end sections 10 and 12 and a connecting back section 11, it will be understood that there may be additional sections. In the embodiment illustrated, the end sections 10 and 12 have upper ends 24 and 25 respectively which are curved toward each other to be axially aligned.

In any event, the lower end portions of the end sections 10 and 12 have secured thereto, as by pins 20, the opposite end portions of a saw blade member B. The particular type of the blade member does not, of course, form any particular part of this invention.

There will be means connecting the sections 10, 11 and 12 together and according to the preferred form of the invention such means will consist of connecting rod members 22 and 23 which have their opposite end portions formed to extend respectively into the hollow end portions of adjacently-disposed sections 11 and 12 and 10 and 11. Thus, the rod member 23 is downwardly curved to be substantially complementary to the curved upper end 24 of the end section 10, while the rod member 22 is straight and complementary to the open adjacent end of back section 11. Then there will be permanent securing means holding one end portion of each member 22 or 23 to the sleeve or section 11 or 12 within which it is disposed, and this may be provided by making holes in the sections 11 or 12 and the members 22 and 23, and thereupon welding the same together as at 21.

The opposite end portions of the members 22 or 23 will be connected to their respective receiving sections 10 or 11 in a different manner. Here there are radial holes 19 drilled into the rod members 22 and 23 and latch dogs 26 are disposed therein.

Locking screws 28 are threadedly disposed in suitable threaded counterbores 16 of bores 17 which extend axially into the said end portions of the rod members 22 and 23, said screws 28 are provided with inner end portions 40 of reduced cross section providing pins which are received in bores 17 and in the slots 42 in the latch dogs 26. Expansive spring means, such as coil springs 46, are disposed in the previously-mentioned holes 19, to load the dogs 26 outwardly. At the same time the latch dogs 26 are held against unwanted displacement by the pins 40. The end sections 10 and the back section 11 are formed with holes 15 providing latch detents which are engageable with the latch dogs 26 to lock the sections rigidly together.

It will thus be seen that a substantially U-shaped frame is formed so that a blade of any desired length may be properly tensioned and supported in such a way that the utmost efficiency can be achieved with the operation thereof.

From the foregoing it will now be seen that there is herein provided a device which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

The combination with a pair of hollow tubes arranged in end to end facing relation, of a locking means securing the facing ends of said tubes together, said means comprising a solid rod member conformably shaped to fit within said tubes interposed between the facing ends of said tubes and having one end extending into the facing end of one of said tubes and fixedly secured thereto and having the other end extending loosely into the facing end of the other of said tubes, there being a threaded bore extending inwardly from the other end of said rod member and terminating at a point spaced from said other end of said rod member, the bore being arranged axially of said rod member, a locking screw arranged axially of and in threaded engagement with said bore, a pin positioned within said bore inwardly of said screw and fixedly carried by said screw, and a spring actuable latch dog arranged transversely of said rod member inwardly of and spaced from said screw and mounted for projectile and contractile movement out of and into the adjacent portion of said other tube to thereby lockingly and unlockingly secure said other tube to said one tube, said dog having a slot intermediate its ends extending transversely therethrough freely receiving said pin for limiting the projectile movement of said latch dog.

EUGENE J. LEGASSEY.
VERNON P. LEAVITT.

References Cited in the file of this patent

UNITED STATES PATENTS

| Number | Name | Date |
|---|---|---|
| 266,075 | Ball | Oct. 17, 1882 |
| 288,459 | Leet | Nov. 13, 1883 |
| 389,335 | Spear | Sept. 11, 1888 |
| 589,719 | Griffin | Sept. 7, 1897 |
| 653,947 | Condon | July 17, 1900 |
| 799,176 | Marble et al. | Sept. 12, 1905 |
| 1,018,172 | Downs | Feb. 20, 1912 |
| 1,349,427 | McKenney | Aug. 10, 1920 |
| 1,609,980 | Wirth | Dec. 7, 1926 |
| 2,303,705 | Persson | Dec. 1, 1942 |
| 2,590,231 | Chilton | Mar. 25, 1952 |